United States Patent
Kumagai

(10) Patent No.: US 10,057,457 B2
(45) Date of Patent: Aug. 21, 2018

(54) IMAGE PROCESSING APPARATUS TO PRINT IMAGE DATA RECEIVED BY FACSIMILE COMMUNICATION

(71) Applicant: CANON KABUSHIKI KAISHA, Tokyo (JP)

(72) Inventor: Takekazu Kumagai, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/726,259

(22) Filed: Oct. 5, 2017

(65) Prior Publication Data

US 2018/0041659 A1 Feb. 8, 2018

Related U.S. Application Data

(63) Continuation of application No. 15/142,861, filed on Apr. 29, 2016, now Pat. No. 9,813,587.

(30) Foreign Application Priority Data

May 7, 2015 (JP) ................................. 2015-094885

(51) Int. Cl.
*G06K 15/02* (2006.01)
*H04N 1/393* (2006.01)
*H04N 1/00* (2006.01)

(52) U.S. Cl.
CPC ......... *H04N 1/393* (2013.01); *H04N 1/00206* (2013.01); *H04N 1/3935* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 7,701,491 B2* | 4/2010 | Abe ..................... | H04N 1/3875 348/240.2 |
| 2008/0088868 A1* | 4/2008 | Endo .................. | H04N 1/32363 358/1.13 |
| 2015/0172474 A1* | 6/2015 | Uruma ............... | H04N 1/32702 358/1.15 |

* cited by examiner

*Primary Examiner* — Henok A Shiferaw
(74) *Attorney, Agent, or Firm* — Canon U.S.A., Inc. IP Division

(57) ABSTRACT

An image processing apparatus includes a reception unit, a conversion unit, and a storage unit. The reception unit receives image data by facsimile communication. The conversion unit converts the image data received by the reception unit into image data having a print paper size of a fixed size. The storage unit stores, in a file, the image data converted by the conversion unit.

8 Claims, 5 Drawing Sheets

IMAGE PROCESSING APPARATUS TO PRINT IMAGE DATA RECEIVED BY FACSIMILE COMMUNICATION

CROSS-REFERENCE TO RELATED APPLICATIONS

This application is a continuation of U.S. application Ser. No. 15/142,861, which was filed on Apr. 29, 2016 and which claims priority to Japanese Patent Application No. 2015-094885, which was filed on May 7, 2015. Both of these applications are incorporated by reference in their entireties.

BACKGROUND

Field of the Invention

The present invention relates to an image processing apparatus for storing image data received by facsimile communication, a method for controlling the image processing apparatus, and a storage medium.

Description of the Related Art

When a conventional image processing apparatus stores in a file image data received by facsimile communication, the apparatus stores the image without adjusting the image size.

In facsimile communication, the main scanning size of an image is limited to 215 mm, 255 mm, and 303 mm as prescribed by the International Telecommunication Union Telecommunication Standardization Sector (ITU-T) Recommendation T.4. Therefore, when the transmitting side transmits an A4-size document with a main scanning size of 210 mm and a sub scanning size of 297 mm, an image with a main scanning size of 215 mm and a sub scanning size of 297 mm will be transmitted on a facsimile communication path. On the receiving side, a file of an image with a main scanning size of 215 mm and a sub scanning size of 297 mm will be generated and stored since the size conversion is not performed on the received image.

However, when a file generated in this way is to be printed, for example, in a mode for selecting the most suitable recording paper according to the image size, a digital multifunction peripheral will determines the Legal paper with a main scanning size of 215 mm as the most suitable recording paper. Therefore, an image transmitted in A4 size will be printed in the Legal size. If the Legal paper is not used, a user needs to reselect the recording paper to be used for printing.

Although Japanese Patent Application Laid-Open No. 11-75059 discusses a technique for printing a long image received by facsimile after size reduction according to the resolution of a printer, the above-described problem cannot be solved by the technique.

SUMMARY

According to an aspect of the present invention, an image processing apparatus includes a reception unit configured to receive image data by facsimile communication, a conversion unit configured to convert the image data received by the reception unit into image data having a print paper size of a fixed size, and a storage unit configured to store, in a file, the image data converted by the conversion unit.

Further features of the present invention will become apparent from the following description of exemplary embodiments with reference to the attached drawings.

DESCRIPTION OF THE EMBODIMENTS

An exemplary embodiment of the present invention will be described below with reference to the accompanying drawings.

Figure 1:
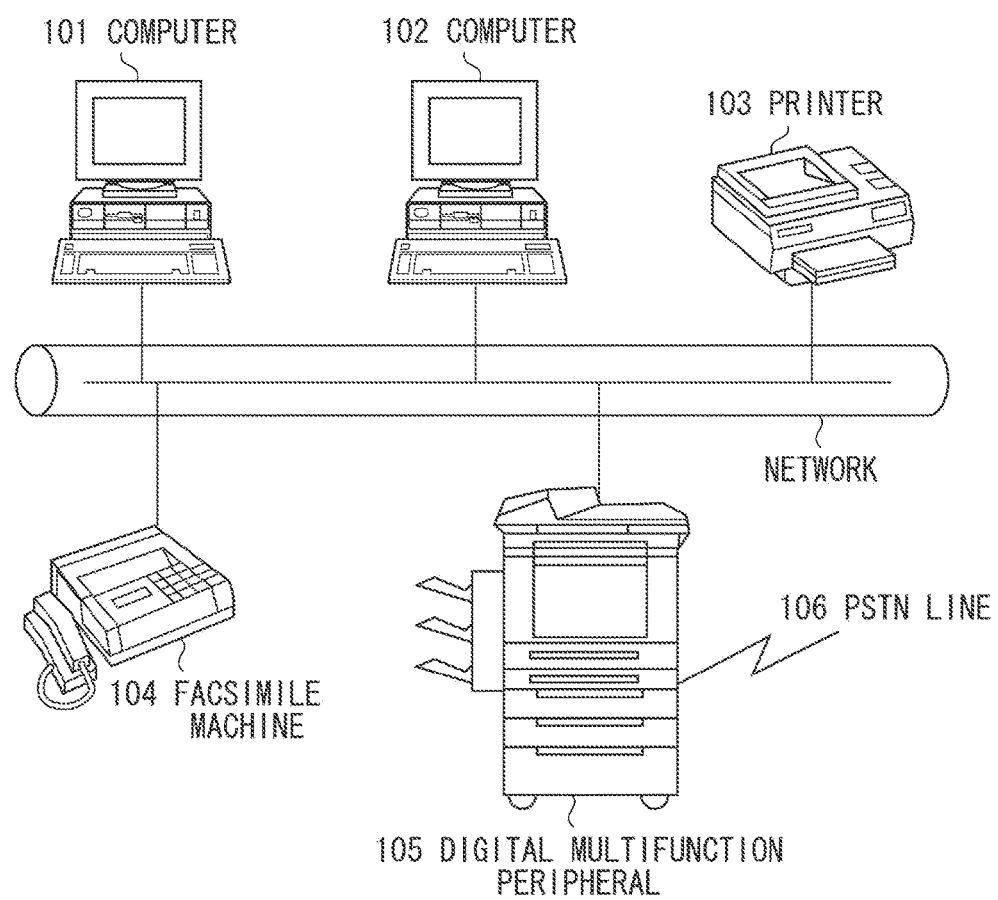
FIG. 1 illustrates an example of a system configuration of a network system.

FIG. 1 illustrates an example of a system configuration of a network system. Referring to FIG. 1, computers 101 and 102, which issue a print request to a printer 103 and a digital multifunction peripheral 105, are connected to a network 100. The printer 103 that receives a print request from the computer 101 and the like, a facsimile machine 104 capable of Internet-FAX (IFAX) reception, and the digital multifunction peripheral 105 are further connected to the network 100. The digital multifunction peripheral 105 is connected with a public switched telephone network (PSTN) line 106 as a telephone line. The digital multifunction peripheral 105 is an example of an image processing apparatus.

Figure 2:
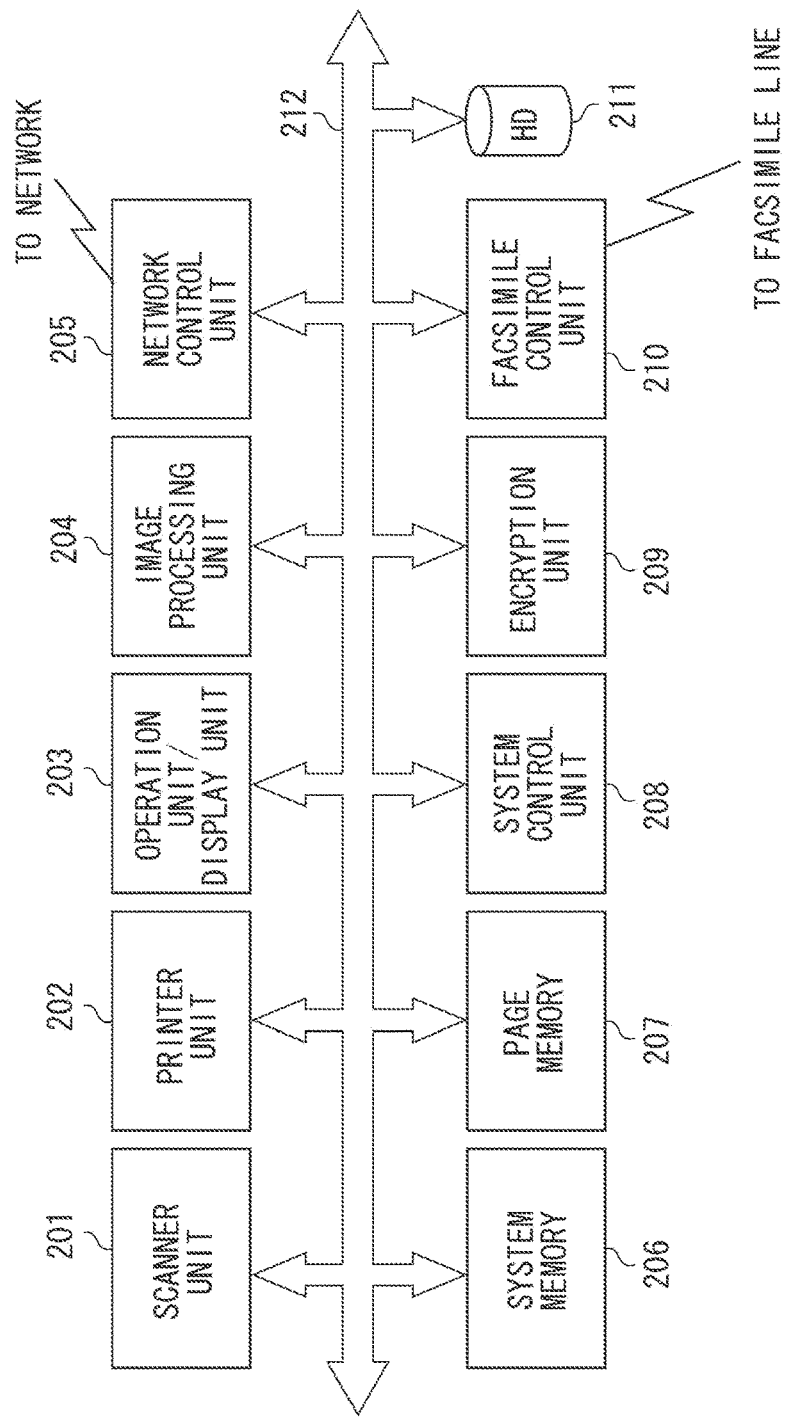
FIG. 2 illustrates an example of a hardware configuration of a digital multifunction peripheral.

FIG. 2 illustrates an example of a hardware configuration of the digital multifunction peripheral 105.

Under the control of a system control unit 208, a scanner unit 201 scans a document in a specified mode (for example, paper size, resolution, and density). A printer unit 202 includes a plurality of recording paper trays each being loaded with recording papers with a size corresponding to the relevant recording paper tray. Under the control of the system control unit 208, the printer unit 202 selects a recording paper according to the size of file data related to an image stored in a hard disk (HD) 211, and prints the image on the selected recording paper. Then, the printer unit 202 discharges the recording paper with the image printed thereon to a discharge tray via a discharge apparatus such as a finisher. Under control of the system control unit 208, an operation unit/display unit 203 displays a setting screen, and receives setting information via the setting screen in response to a user's setting operation. Under the control of the system control unit 208, an image processing unit 204 encodes image information to be transmitted into data and compresses the data, and decodes received compressed data to restore original image information. Under the control of the system control unit 208, the image processing unit 204 further converts scanned image data and image data received by facsimile communication into files in the Joint Photographic Experts Group (JPEG), Tagged Image File Format (TIFF), and Portable Document Format (PDF) formats. Conversely, under the control of the system control unit 208, the image processing unit 204 also converts files in the JPEG, TIFF, and PDF formats into a printable image format.

Under the control of the system control unit 208, a network control unit 205 connects the digital multifunction peripheral 105 to a local area network (LAN) to transmit and receive information to and from an apparatus in other network environment. A system memory 206 including a random access memory (RAM) unit and a read only memory (ROM) unit stores information preregistered in the digital multifunction peripheral 105 and information used by the system control unit 208 to perform processing. A page memory 207 is a memory onto which image information for one page is loaded when the date is encoded or decoded. The system control unit 208 is a microcomputer for monitoring and controlling each of the hardware components illustrated in FIG. 2. Under the control of the system control unit 208, an encryption unit 209 encrypts image data when the image data is accumulated in the HD 211. When image data is accumulated without encrypting the image data, the image data is encoded by the image processing unit 204 and then stored in the HD 211 as it is. When image data is accumulated after encrypting the image data, the image data is encoded, further encrypted by the encryption unit 209, and then stored in the HD 211. A facsimile control unit 210 is connected to a facsimile line such as a PSTN line. The facsimile control unit 210 communicates with other facsimile machines via the PSTN line, and is capable of performing facsimile communication conforming to the communication protocol ITU-T Recommendations V.8, V.21, V.23, V.27ter, V.29, V.17, and V.34. The HD 211 including a nonvolatile memory stores received documents and scanned documents.

Functions of the digital multifunction peripheral 105 and processing of flowcharts (described below) are implemented by the system control unit 208 performing processing based on a program stored in the system memory 206 or the HD 211.

Figure 3:
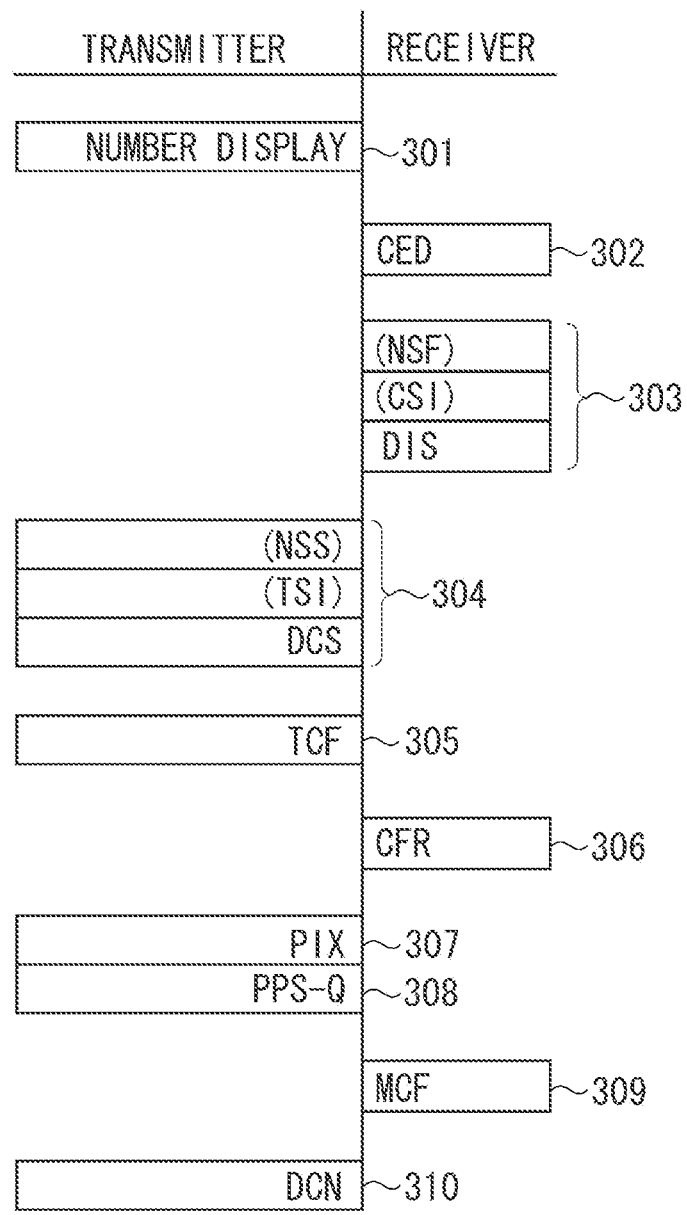
FIG. 3 is a sequence diagram illustrating an example of facsimile communication performed by the digital multifunction peripheral.

FIG. 3 is a sequence diagram illustrating an example of facsimile communication performed by the digital multifunction peripheral 105. When a facsimile machine (transmitter) on the transmitting side makes a call to a facsimile machine (receiver) on the receiving side, the receiver sends out a primary response signal to the transmitter. After receiving the primary response signal, the transmitter transmits number display information (number display) 301 to the receiver by using a V.23 modem signal. After receiving the V.23 modem signal, the receiver sends out a reception completion signal to a network. Then, upon reception of a Call Identification (CI) signal as a call signal from the network, the receiver returns a secondary response signal to the network. Then, the receiver sends out a Called Station Identification (CED) signal 302 as a conventional facsimile procedure signal. Subsequently, the receiver sends out receiver capability information (Digital Identification Signal (DIS)), receiver's registered telephone number information (Called Subscriber Identification (CSI)), and, as an option, a Non-Standard Facilities (NSF) signal 303. Upon reception of the DIS, CSI, and NSF signals from the receiver, the transmitter sends out transmission instruction information (Digital Command Signal (DCS)), transmitter's registered telephone number information (Transmitting Subscriber Identification (TSI)), and, as an option, a Non-Standard facilities Setup (NSS) signal 304. Subsequently, the transmitter sends out a Training ConFirmation (TCF) signal 305 as a dummy image signal. After receiving the TCF signal 305, when the receiver determines that this dummy image signal can be received, the receiver sends out a ConFirmation to Receive (CFR) signal 306 as an acknowledge (ACK). Upon reception of the CFR signal, the transmitter sends out image data PIX 307. The transmitter further sends out Partial Page Signals (PPS)-Q 308 which indicate the end of a page. The PPS-Q signals 308 include PPS-MultiPage Signal (MPS), PPS-End Of Procedures (EOP), and PPS-End Of Message (EOM). Upon reception of the PPS-Q signals 308, when the receiver determines that the received image data is normal, the receiver sends out a Message ConFirmation (MCF) signal 309. Upon reception of the MCF signal, when the transmitter determines that transmission of all of the image data is completed, the transmitter sends out a DisCoNnection (DCN) signal 310 to terminate the facsimile communication sequence. Upon reception of the DCS signal, the receiver similarly terminates the facsimile communication sequence.

Figure 4:
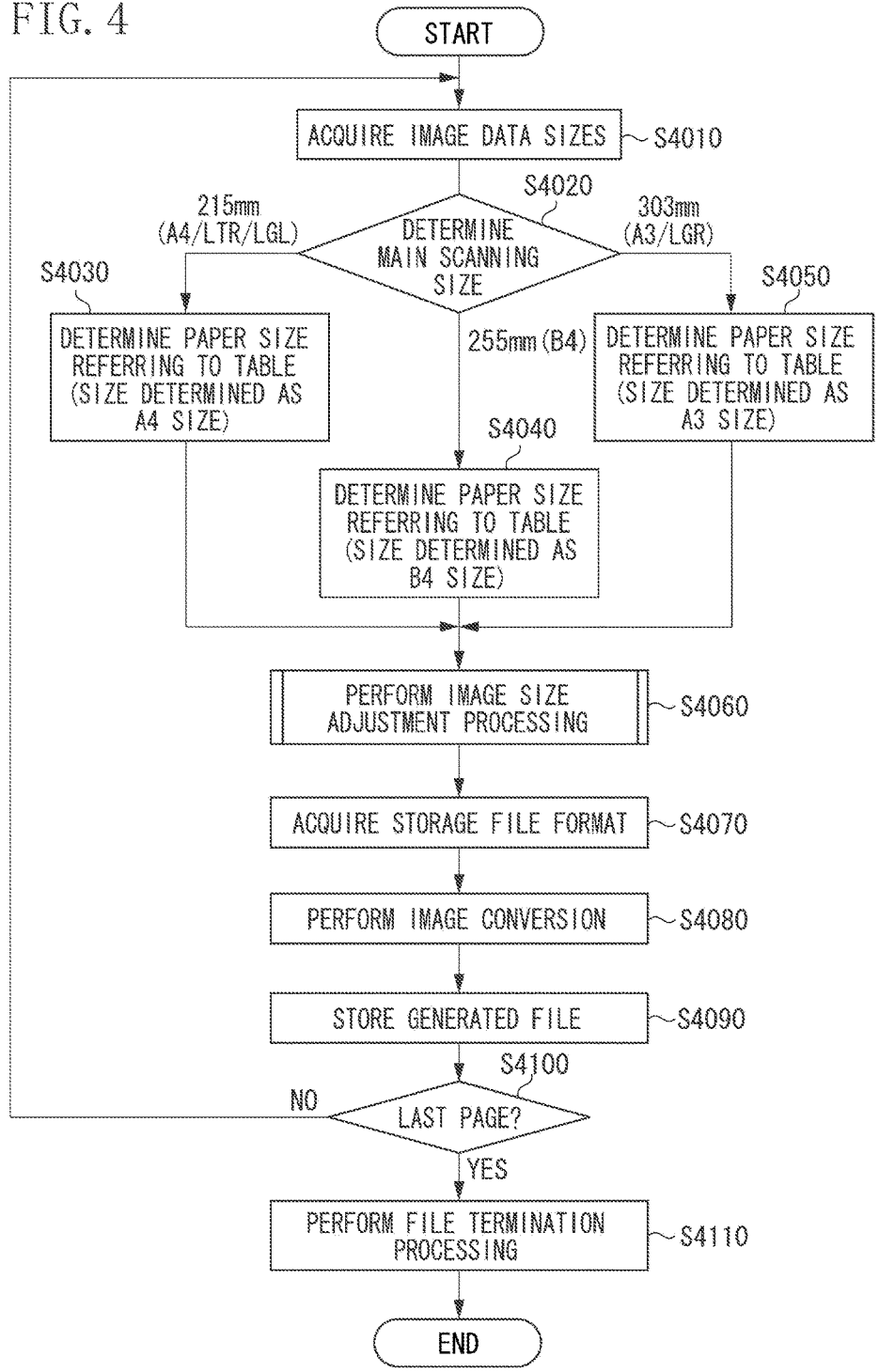
FIG. 4 is a flowchart illustrating an example of information processing performed when facsimile reception data is stored in a file.

FIG. 4 is a flowchart illustrating an example of information processing performed when facsimile reception data is stored in a file.

When image data received by facsimile communication is to be stored in a file, the processing illustrated in FIG. 4 is started.

In step S4010, the system control unit 208 acquires image data received by facsimile communication, and acquires the sizes (i.e. main scanning size and sub scanning size) of the image data.

In step S4020, the system control unit 208 determines the main scanning size of the image data and causes the processing to proceed to different steps according to the determined main scanning size. When the main scanning size is 215 mm (215 mm (A4/LTR/LGL) in step S4020), the system control unit 208 causes the processing to proceed to step S4030. When the main scanning size is 255 mm (255 mm (B4) in step S4020), the system control unit 208 causes the processing to proceed to step S4040. When the main scanning size is 303 mm (303 mm (A3/LGR) in step S4020), the system control unit 208 causes the processing to proceed to step S4050.

In step S4030, referring to Table 1, the system control unit 208 determines which paper size has a sub scanning size which the sub scanning size of the image data is greater than or equal thereto. When the sub scanning size of the image data is smaller than 279.4 mm, the system control unit 208 does not determine the paper size.

For example, when the sub scanning size of the image data is 297 mm, the system control unit 208 determines the A4 size. When the sub scanning size of the image data is 280 mm, the system control unit 208 determines the letter (LTR) size.

TABLE 1

| Main scanning A4 (215 mm) | | |
|---|---|---|
| LTR | A4 | LGL |
| 279.4 | 297 | 355.6 |

In step S4040, referring to Table 2, the system control unit 208 determines which paper size has a sub scanning size which the sub scanning size of the image data is greater than or equal thereto. When the sub scanning size of the image data is smaller than 364 mm, the system control unit 208 does not determine the paper size.

For example, when the sub scanning size of the image data is greater than or equal to 364 mm, the system control unit 208 determines the B4 size.

TABLE 2

| Main scanning B4 (255 mm) |
|---|
| B4 |
| 364 |

In step S4050, referring to Table 3, the system control unit 208 determines which paper size has a sub scanning size which the sub scanning size of the image data is greater than or equal thereto. When the sub scanning size of the image data is smaller than 420 mm, the system control unit 208 does not determine the paper size.

For example, when the sub scanning size of the image data is 420 mm, the system control unit 208 determines the A3 size. When the sub scanning size of the image data is 432 mm or larger, the system control unit 208 determines the 11×17 size.

TABLE 3

| Main scanning A3 (303 mm) | |
|---|---|
| A3 | 11 × 17 |
| 420 | 432 |

In step S4060, the system control unit 208 performs image size adjustment processing. This processing will be separately described below with reference to FIG. 5.

In step S4070, the system control unit 208 refers to setting information of a storage file format stored in a static RAM (SRAM) area provided in the system memory 206. The setting information of the storage file format can be set by an operator via the operation unit/display unit 203. Selectable setting values include "JPEG", "TIFF", "PDF", etc. More specifically, the system control unit 208 is capable of setting or changing the setting information of the storage file format stored in the SRAM area in response to the operator's setting operation via the operation unit/display unit 203.

In step S4080, according to the setting information of the storage file format acquired in step S4070, the system control unit 208 controls the image processing unit 204 to perform conversion processing for converting the image that has undergone the size adjustment processing in step S4060 into a file.

In step S4090, the system control unit 208 stores the data of the file generated in step S4080 in the HD 211.

In step S4100, the system control unit 208 determines whether the page that has been processed is the last page. When the page is the last page (YES in step S4100), the system control unit 208 causes the processing to proceed to step S4110. On the other hand, when the page is not the last page (NO in step S4100), the system control unit 208 causes the processing to return to step S4010.

In step S4110, the system control unit 208 performs file termination processing. For example, in the case of a PDF format file, the system control unit 208 performs the file termination processing by storing file trailer information at the end of the file.

Then, the processing for storing facsimile reception data in a file is ended.

Figure 5:
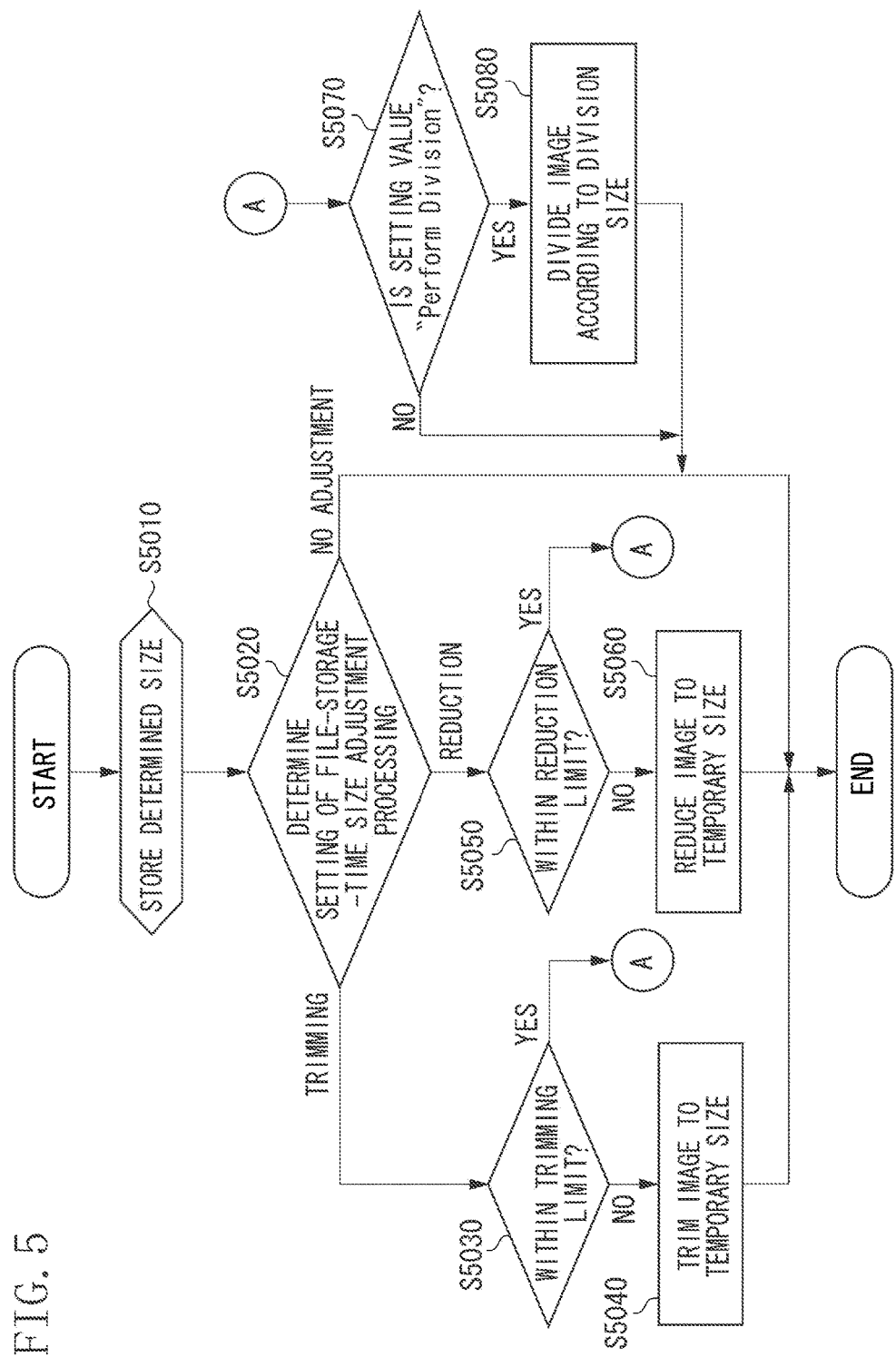
FIG. 5 is a flowchart illustrating an example of image size adjustment processing performed in step S4060.

FIG. 5 is a flowchart illustrating an example of the image size adjustment processing performed in step S4060.

In step S5010, the system control unit 208 stores the size determined by the processing in the previous step (one of steps S4030, S4040, and S4050) as a variable.

In step S5020, the system control unit 208 refers to setting information of file-storage-time size adjustment processing stored in the SRAM area provided in the system memory 206. The setting information of the file-storage-time size adjustment processing can be set by the operator via the operation unit/display unit 203. Selectable setting values include "Trimming", "Reduction", and "No adjustment". More specifically, the system control unit 208 is capable of setting or changing the setting value of the file-storage-time size adjustment processing setting information stored in the SRAM area in response to an operator's setting operation via the operation unit/display unit 203. In the present exemplary embodiment, the setting values such as "Trimming", "Reduction", etc. are preset as a default value according to the customer or sales area of the digital multifunction peripheral 105 at the time of shipment of the digital multifunction peripheral 105.

In step S5020, the system control unit 208 determines the setting value of the file-storage-time size adjustment processing and causes the processing to proceed to different steps according to the determined setting value of the file-storage-time size adjustment processing. When the setting value is "Trimming" (TRIMMING in step S5020), the system control unit 208 causes the processing to proceed to step S5030. When the setting value is "Reduction" (REDUCTION in step S5020), the system control unit 208 causes the processing to proceed to step S5050. When the setting value is "No Adjustment" (NO ADJUSTMENT in step S5020), the system control unit 208 ends the processing of the flowchart illustrated in FIG. 5.

In step S5030, the system control unit 208 refers to trimming limit setting information stored in the SRAM area provided in the system memory 206. The trimming limit setting information can be set by the operator via the operation unit/display unit 203. Selectable setting values include an integral value from "70" to "99" percents. More specifically, the system control unit 208 is capable of setting or changing the setting value of the trimming limit setting information stored in the SRAM area in response to an operator's setting operation via the operation unit/display unit 203.

Then, the system control unit 208 calculates the ratio in percentage of the size after trimming to the original image size in a case where the image is trimmed from the sub scanning size of the image into a temporary sub scanning size. When the calculated value is equal to or greater than the setting value of the trimming limit setting (NO in step S5030), the system control unit 208 causes the processing to proceed to step S5040. On the other hand, when the calculated value is smaller than the setting value of the trimming limit setting (YES in step S5030), the system control unit 208 causes the processing to proceed to step S5070.

In step S5040, the system control unit 208 performs trimming, i.e., processing for cutting out a part of the image data to adjust the image size to the temporary size. Further, when the size after trimming is the A4 size, the system control unit 208 performs trimming so that the size of the image data not only in the sub scanning direction but also in the main scanning direction becomes the A4 size.

In step S5050, the system control unit 208 refers to reduction limit setting information stored in the SRAM area provided in the system memory 206. The reduction limit setting information can be set by the operator via the operation unit/display unit 203. Selectable setting values include an integral value from "70" to "99" percents. More specifically, the system control unit 208 is capable of setting or changing the setting value of the reduction limit setting information stored in the SRAM area in response to an operator's setting operation via the operation unit/display unit 203.

Then, the system control unit 208 calculates the ratio in percentage of the size after reduction to the original image size in a case where the image is reduced from the sub scanning size of the image into a temporary sub scanning size. When the calculated value is equal to or greater than the setting value of the reduction limit setting (NO in step S5050), the system control unit 208 causes the processing to proceed to step S5060. On the other hand, when the calculated value is smaller than the setting value of the reduction limit setting (YES in step S5050), the system control unit 208 causes the processing to proceed to step S5070.

In step S5060, the system control unit 208 performs reduction processing to adjust the image size to the temporary size.

In step S5070, the system control unit 208 refers to file-generation-time division setting information stored in the SRAM area provided in the system memory 206. The file-generation-time division setting information can be set by the operator via the operation unit/display unit 203. Selectable setting values include "Perform Division" and "Do Not Perform Division". More specifically, the system control unit 208 is capable of setting or changing the setting value of the file-generation-time division setting information stored in the SRAM area in response to an operator's setting operation via the operation unit/display unit 203. When the setting value is "Perform Division" (YES in step S5070), the system control unit 208 causes the processing to proceed to step S5080. On the other hand, when the setting value is "Do Not Perform Division" (NO in step S5070), the system control unit 208 ends the processing of the flowchart illustrated in FIG. 5.

In step S5080, the system control unit 208 refers to file-generation-time division size setting information stored in the SRAM area provided in the system memory 206. The file-generation-time division size setting information can be set by the operator via the operation unit/display unit 203. Selectable setting values include "A4", "LTR", and "Legal (LGL)". More specifically, the system control unit 208 is capable of setting or changing the setting value of the file-generation-time division size setting information stored in the SRAM area in response to an operator's setting operation via the operation unit/display unit 203. According to the setting value of the file-generation-time division size setting information, the system control unit 208 divides the image at intervals of the set sub scanning size.

Then, the system control unit 208 ends the processing of the flowchart illustrated in FIG. 5.

As described above, according to the exemplary embodiment, it is possible to store image data received by facsimile communication in a file after reduction or trimming thereof according to a recording paper size. Therefore, when printing a stored file in a mode for selecting recording paper most suitable for the image size, the file can be printed on recording paper with the same size as the document at the transmission source.

Therefore, it is possible to print the image data received by facsimile communication using recording paper with the most suitable size even if the user does not reselect recording paper.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
a network controller connecting a network;
a facsimile controller connecting a facsimile communication line different from the network;
a storage;
a memory storing instructions; and
a processor configured to execute the instructions to cause the information processing apparatus to:
receive, using the facsimile controller, image data from the facsimile communication, wherein the received image data has a main scanning size prescribed by a recommendation as a standard for the facsimile communication,
acquire the main scanning size and a sub scanning size of the received image data,
determine, according to the acquired main scanning size, a first size as a target size of a main scanning direction from a plurality of candidates, wherein each candidate indicates a size corresponding to a different print paper independent of the recommendation,
determine, according to the acquired sub scanning size, a second size as a target size of a sub scanning direction from a plurality of candidates corresponding to the determined first size,
perform adjustment processing for the received image data according to the determined first size and the determined second size,
generate a file using an image data that has a converted main scanning size and a converted sub scanning size, converted by the adjustment processing, and
store the generated file in the storage.

2. The image processing apparatus according to claim 1, wherein, in the adjustment processing, trimming process, or reduction process is performed to the received image data according to the determined first size and the determined second size.

3. The image processing apparatus according to claim 1, wherein the plurality of candidates used for the determination for the main scanning direction include 215 millimeters (mm), 255 mm and 303 mm.

4. The image processing apparatus according to claim 1, wherein the recommendation as the standard for the facsimile communication is the International Telecommunication Union Telecommunication Standardization Sector (ITU-T) Recommendation.

5. A method for controlling an image processing apparatus having a network controller connecting a network, a facsimile controller connecting a facsimile communication line different from the network, and a storage, the method comprising:

receiving, using the facsimile controller, image data from the facsimile communication, wherein the received image data has a main scanning size prescribed by a recommendation as a standard for the facsimile communication;

acquiring the main scanning size and a sub scanning size of the received image data;

determining, according to the acquired main scanning size, a first size as a target size of a main scanning direction from a plurality of candidates, wherein each candidate indicates a size corresponding to a different print paper independent of the recommendation;

determining, according to the acquired sub scanning size, a second size as a target size of a sub scanning direction from a plurality of candidates corresponding to the determined first size;

performing adjustment processing for the received image data according to the determined first size and the determined second size;

generating a file using an image data that has a converted main scanning size and a converted sub scanning size, converted by the adjustment processing; and storing the generated file in the storage.

6. The method according to claim 5, wherein the recommendation as the standard for the facsimile communication is the International Telecommunication Union Telecommunication Standardization Sector (ITU-T) Recommendation.

7. A non-transitory computer-readable storage medium storing a program to cause a computer to perform a method for controlling an image processing apparatus having a network controller connecting a network, a facsimile controller connecting a facsimile communication line different from the network, and a storage, the method comprising:

receiving, using the facsimile controller, image data from the facsimile communication, wherein the received image data has a main scanning size prescribed by a recommendation as a standard for the facsimile communication;

acquiring the main scanning size and a sub scanning size of the received image data;

determining, according to the acquired main scanning size, a first size as a target size of a main scanning direction from a plurality of candidates, wherein each candidate indicates a size corresponding to a different print paper independent of the recommendation;

determining, according to the acquired sub scanning size, a second size as a target size of a sub scanning direction from a plurality of candidates corresponding to the determined first size;

performing adjustment processing for the received image data according to the determined first size and the determined second size;

generating a file using an image data that has a converted main scanning size and a converted sub scanning size, converted by the adjustment processing; and storing the generated file in the storage.

8. The non-transitory computer-readable storage medium according to claim 7, wherein the recommendation as the standard for the facsimile communication is the International Telecommunication Union Telecommunication Standardization Sector (ITU-T) Recommendation.

* * * * *